United States Patent Office 2,824,900
Patented Feb. 25, 1958

2,824,900

PROCESS FOR THE PRODUCTION OF 1,1,1-TRI-FLUORO-2-CHLOROETHANE

Marcello Terruzzi, Milan, Italy, assignor to Montecatini, Societa Generale per l'Industria Mineraria e Chimica, a corporation of Italy No Drawing. Application May 10, 1955
Serial No. 507,480

Claims priority, application Italy June 1, 1954

4 Claims. (Cl. 260—653)

The present invention relates to a process for the commercial production of 1,1,1-trifluoro-2-chloroethane, and more particularly to the production of said compound from 1,1,2,2-tetrachloroethane, usually called "symmetrical tetrachloroethane."

1,1,1-trifluoro-2-chloroethane may be used as refrigerant or as reagent in organic chemistry. Furthermore, it may be employed as propellant for aerosols even in cases where the formulation contains water or alcohol. Since it is resistant to hydrolysis similar to 1-2-dichloro-1,1,2,2-tetrafluoroethane, it may, therefore, replace the latter, alone or in mixture with other propellants, such as, for example, difluoro-dichloromethane.

1,1,1-trifluoro-2-chloroethane has been hitherto prepared at commercial yields only by reacting 1,1,1,2-tetrachloroethane, called "asymmetrical tetrachloroethane," with anhydrous hydrofluoric acid in the presence of a catalyst prepared by fluorination of antimony pentachloride, or by reacting 1,1-difluoro-1,2-dichloroethane (likewise obtained from asymmetrical tetrachloroethane) with anhydrous hydrofluoric acid, also in the presence of a catalyst prepared by fluorination of antimony pentachloride.

It is the object of the present invention to provide a method for the commercial production of 1,1,1-trifluoro-2-chloroethane that utilizes symmetrical tetrachloroethane which represents a far less expensive starting material than the above-mentioned asymmetrical compound. The new method is based on the unexpected discovery that, under certain conditions, antimony pentachloride is capable of catalyzing both the fluorination of a halogenated ethane and an inner transposition of hydrogen, so that a halogenated ethane derivative containing one hydrogen atom bound to each of the two carbon atoms is converted to another halogenated ethane derivative having one carbon atom wholly halogenated and the other one bound to two hydrogen atoms and one halogen atom.

The process of the present invention comprises, basically, heating symmetrical tetrachloroethane in an autoclave, under anhydrous conditions and at a pressure higher than atmospheric pressure, with an excess of hydrofluoric acid and in the presence of antimony pentachloride and definite amounts of free chlorine. A 5 to 20% excess over the theoretically necessary amount of hydrofluoric acid may be present, whereas the antimony pentachloride must be present in molar amounts varying from $\frac{1}{10}$ to $\frac{1}{2}$ of the molar quantity of symmetrical tetrachloroethane.

The above-mentioned materials are reacted in the autoclave at a temperature between 90 and 170° C., preferably between 110 and 150° C., for a period of time not less than two hours and at a pressure that is at least 5 atm. higher than the vapor pressure of the anhydrous hydrofluoric acid at the temperature of the reaction.

Under these conditions, a quantity of free chlorine is present that limits, as far as possible, the reduction of the antimony salt to the trivalent form.

The following examples are given to illustrate the invention, without intending to thereby limit the scope of the disclosure.

*Example 1*

1 mol of $SbCl_5$ is introduced into a stainless steel autoclave, fitted with a vertical condenser having a water jacket, a thermometer and a discharge valve at the top. Subsequently, 5 mols of symmetrical tetrachloroethane are added whereupon the autoclave is charged with 19.5 mols of liquid anhydrous hydrofluoric acid. Finally, compressed gaseous chlorine is entered until the autoclave is under 5 atm. pressure. The autoclave is then heated, with the discharge valve closed, until a pressure of about 30 atm. is reached and then, while the heating is continued, the discharge valve is opened sufficiently wide so as to maintain a constant pressure of 30 atm. The discharged gaseous products, consisting mostly of hydrochloric acid, are bubbled through an alkaline absorber which is connected with two successive traps that are cooled with brine.

The autoclave is heated to 120° C., while maintaining the pressure at 30 atm., until it is observed that, upon closing the discharge valve, the pressure does not tend to increase any longer. This will be the case after about five hours of heating. When the reaction is finished, the autoclave is completely emptied of gaseous phase products and the now discharged fluorochlorohydrocarbons are collected in the afore-mentioned brine-cooled traps.

By means of fractional distillation, more than 4 mols of 1,1,1-trifluoro-2-chloroethane having a boiling point of 6–8° C. and representing a conversion rate higher than 80%, are obtained together with less fluorinated products, consisting primarily of 1,1-difluoro-2,2-dichloroethane, in such a quantity that the total yield of fluorinated products is higher than 95%. Such less fluorinated products are used in subsequent batches for the production of 1,1,1-trifluoro-2-chloroethane as will be described in Examples 3 and 4.

*Example 2*

In order to reactivate the catalyst, gaseous chlorine is introduced into the autoclave, which is still warm from a previous operation, say the operation of Example 1, until a pressure of 5 atm. is attained. After cooling, that is after about two hours, the residual chlorine pressure is released and 5 mols of symmetrical tetrachloroethane are added. Subsequently, 16.5 mols of liquid anhydrous hydrofluoric acid are introduced, preferably propelled by compressed chlorine gas, until a pressure of 5 atm. is attained inside the autoclave. The operation is then continued exactly as described in Example 1, and identical amounts of fluorinated products are obtained.

*Example 3*

After reactivation of the catalyst, carried out as described in Example 2, the less fluorinated products obtained in the preceding examples and a quantity of symmetrical tetrachloroethane sufficient to constitute a total of five mol equivalents are introduced into the autoclave. In addition, the autoclave is charged with a quantity of anhydrous hydrofluoric acid that exceeds the theoretical amount by 10%, again by means of chlorine pressure, and the reaction is carried out exactly as described in the preceding examples. The same yields are obtained both of the 1,1,1-trifluoro-2-chloroethane and the less fluorinated products.

From a cycle of operations carried out as described in Examples 1, 2 and 3, 1,1,1-trifluoro-2-chloroethane is obtained at a total conversion rate exceeding 92%, calculated on the basis of symmetrical tetrachloroethane.

Since the process has been carried out twenty times without any need of replacing or adding antimony pentachloride, it appears that the above-described operating conditions do not exert an irreversible adverse effect upon the catalyst.

Example 4

Fluorination of 1,1-difluoro-2,2-dichloroethane obtained as by-product in the preceding examples is carried out by means of the same equipment and the same procedures as described in the previous examples. After introducing 5 mols of 1,1-difluoro-2,2-dichloroethane into the autoclave containing one mol of antimony pentachloride, previously reactivated with chlorine, the autoclave is charged in the afore-described manner by means of chlorine pressure with 6 mols of hydrofluoric acid (constituting a 20% excess over the theoretically necessary amount) until it registers a pressure of 5 atm. After completion of the reaction, carried out in the afore-described manner, it is found that 20% of the difluorodichloroethane introduced did not react and may, therefore, be recovered as such, whereas a quantity of 1,1,1-trifluoro-2-chloroethane has been formed that equals a total yield of 93%, based on the fluorochloroethane present.

The catalyst remaining in the autoclave at the end of the operation may be used, after reactivation with chlorine, for the fluorinations described in the preceding examples.

Example 5

Fluorination of CHClF—CHCl$_2$ obtained by known methods is carried out by means of the same equipment and using the procedures described in the preceding examples. The conversion and yield percentages obtained are equal to those obtained in the preceding examples.

Moreover, I have found that the reactions according to the preceding examples take place at an equal rate of conversion and with similar yields if, instead of antimony pentachloride, one of the known fluorinating compounds is used, corresponding to the empirical formulas SbF$_n$X$_{5-n}$ or SbF$_n$X$_{5-n}$·(5−n)HF wherein X is a halogen different from fluorine and $n$ is the number of atoms of said halogen which are replaced by fluorine in the antimony pentahalide.

I claim:

1. The process of preparing 1,1,1-trifluoro-2-chloroethane which comprises heating, in an atmosphere of chlorine gas adjusted to about 5 atm. pressure at room temperature, at least one member of the group consisting of symmetrical tetrachloroethane, 1,1-difluoro-2,2-dichloroethane and 1-fluoro-1-chloro-2,2-dichloroethane, up to 20% excess over the molar requirements of liquid anhydrous hydrofluoric acid and from 0.1 to 0.5 mol of antimony pentachloride, maintaining a temperature between 90 and 170° C., and maintaining the pressure at least 5 atm. above the vapor pressure of anhydrous hydrofluoric acid at the selected reaction temperature.

2. The process according to claim 1, comprising reactivating the antimony pentachloride used in the process by contacting it with a chlorine atmosphere.

3. The process of preparing 1,1,1-trifluoro-2-chloroethane, which comprises charging an autoclave with one mol equivalent of antimony pentachloride, five mol equivalents of symmetrical tetrachloroethane, up to 20% excess over the molar requirements of liquid anhydrous hydrofluoric acid and a chlorine atmosphere of about 5 atm. pressure, heating to a pressure of about 30 atm. and, while continuing the heating, discharging such amounts of gaseous products so as to maintain a pressure of about 30 atm., continuing heating to about 120° C. and discharging said gaseous products as long as said pressure of about 30 atm. can be maintained, completely discharging the autoclave of gaseous products, passing said gaseous products through alkaline solution into cooled gas-traps and separating 1,1,1-trifluoro-2-chloroethane from less fluorinated reaction products by fractionate distillation.

4. The process according to claim 3, comprising charging the autoclave with said less fluorinated reaction products and a quantity of symmetrical tetrachloroethane sufficient to provide a total of five mol equivalents of tetrachloroethane.

References Cited in the file of this patent

UNITED STATES PATENTS

| | | |
|---|---|---|
| 1,990,692 | Henne | Feb. 12, 1935 |
| 2,007,208 | Midgley et al. | July 9, 1935 |
| 2,554,857 | Gochenour | May 29, 1951 |